June 4, 1940.　　　　　F. J. RAYBOULD　　　　　2,203,237
COUPLING
Filed March 29, 1939
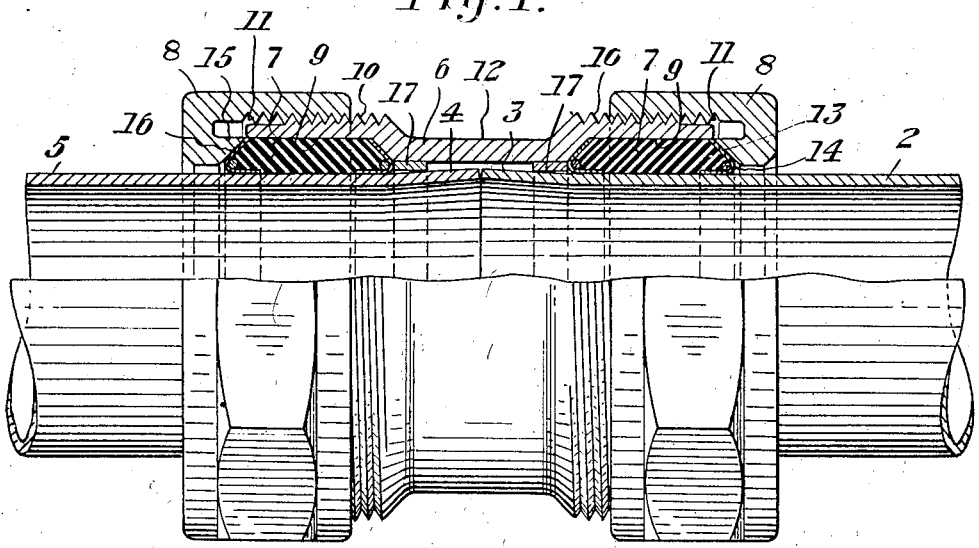
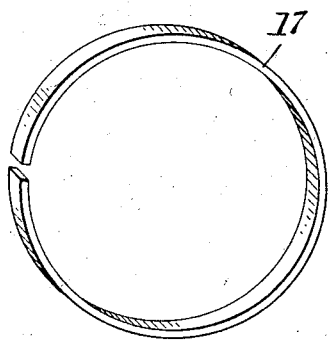
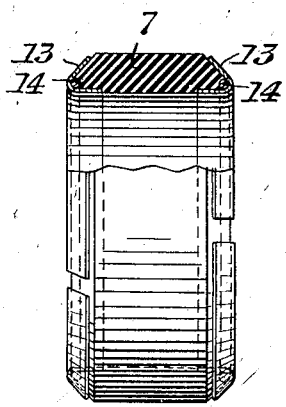
INVENTOR
Frank J. Raybould Patented June 4, 1940

2,203,237

UNITED STATES PATENT OFFICE 2,203,237

COUPLING

Frank J. Raybould, Erie, Pa., assignor to Raybould Coupling Company, Meadville, Pa., a corporation of Pennsylvania Application March 29, 1939, Serial No. 264,753

2 Claims. (Cl. 285—127)

The present invention relates generally to couplings for joining together an inner member such as a pipe or rod and an outer tubular member. More particularly, it relates to the so-called threadless couplings in which the two members to be connected together are not provided with screw threads or any other positive interlocking parts. Couplings of this character are shown and described in my prior Patent No. 1,955,832 and in my copending application Serial No. 112,728 filed November 25, 1936.

Considerable difficulty has been encountered heretofore in providing satisfactory couplings of the character to which the present invention relates. When used in high pressure lines or when used in environments where they are subjected to substantial jarring or substantial end pressures it has been difficult to prevent leaks from developing or to prevent the end pressures from forcing one of the members out of the coupling entirely. These difficulties are particularly acute in installations employing pipes or tubes which have such thin walls as to preclude the use of positive interlocking members. The couplings shown in my prior patent referred to above, and in my copending application, overcome many of the difficulties which have heretofore been encountered in providing appropriate connections of this character. However, even where couplings of this character are employed, some difficulty is encountered in making the connection sufficiently tight to prevent end pressures from pulling or forcing one of the pipe members out of the coupling.

By the present invention I provide a connection or coupling which is of such character that it will resist end pressures to a far greater extent than any of the prior art couplings. For example, where it required approximately 600 pounds to force a pipe member from one of the prior art couplings, I now find that by the use of the present invention it will require approximately 2800 pounds pressure to cause the coupling to break down. Generally speaking, the coupling which I provide by my invention will resist end pressures approximately four to six times as great as the prior art couplings are capable of resisting.

In the accompanying drawing I have shown, for purposes of illustration only, a preferred embodiment of my invention. It will be understood, however, that my invention is not limited to the particular type of coupling disclosed in the drawing as it will be apparent to those skilled in this art that the principles upon which the present invention are founded may be otherwise embodied and the advantages of my invention obtained.

In the drawing—

Figure 1 is a view partly in elevation and partly in section showing a connection embodying my invention;

Figure 2 is a perspective view of a split ring embodied in the coupling shown in Figure 1; and Figure 3 is a view partly in elevation and partly in section of one of the compression rings and the cooperating bushings and reinforcing rings as embodied in the coupling shown in Figure 1.

In the embodiment shown in the drawing, the pipe 2 has an angularly flared end portion 3 positioned adjacent the angularly flared end portion 4 of a similar pipe 5. The joint between the two pipe members is effected through the middle ring 6, the compression rings 7 and the pressure rings 8. Each end of the middle ring 6 is flared outwardly to provide a sufficient space or chamber 9 to receive a compression ring. The end portions of the middle ring are exteriorly threaded and the threads 10 thereon cooperate with threads 11 carried by the inner faces of the pressure rings 8. The central portion 12 of the middle ring is preferably of sufficient length to cause the compression rings 7 to rest against the adjacent pipe on the portion of normal diameter immediately adjacent the flared pipe end.

Each compression ring 7 is provided with split or slotted bushings 13 which extend circumferentially around and angularly about the exposed edges thereof. Each compression ring is also provided with reinforcing rings 14 which extend peripherally around the exposed edges thereof so as to reinforce the compression ring against extrusion between the free clearances provided between the central portion of the middle ring and the pipe members and between the free clearances prevailing between the pressure rings and the pipe members.

Each pressure ring 8 is provided with an inwardly extending projection 15 having a tapered face 16 arranged to cooperate with and bear against the adjacent bushing on the compression ring. As will be readily understood, when a pressure ring 8 is threaded on a threaded end of the middle ring, the inwardly extending projection 15 will bear against the adjacent bushing and will compress the compression ring axially of the pipe and coupling and expand it radially into tight engagement with the pipe member and the middle ring, thereby forming a tight connection between the two.

An expansible ring 17 cooperates with each compression ring and the adjacent pipe member. Each expansible ring 17 is positioned on the flared end of a pipe member between the pipe and the middle ring. One end of each expansible ring also abuts the adjacent bushing carried by the adjacent compression ring. As will be apparent, when a pressure ring is threaded into place and its compression ring is forced into appropriate position, the adjacent expansible ring 17 will be expanded to some extent and brought into engagement with the middle ring and the flared pipe end. It is not necessary that the formation of the main joint or connection between the pipe member and the middle ring shall cause the ring 17 to open up so as to bring it into engagement with the middle ring. The expansible ring 17 can be of such size that the formation of the main joint will not cause engagement between it and the cooperating middle ring. In either event, when the pipe is subjected to end pressure the longitudinal movement of the pipe will cause the ring 17 to open up against the middle ring or will cause it to bear tighter against the middle ring and the ring will cut into the flared end of the pipe. By this arrangement the end pressures are not opposed solely by compressive forces which may tend to bend the flared pipe end downwardly to normal dimensions and thereby permit the pipe to slide through the coupling. The expansible ring 17 will cut into the flared pipe end and subject the pipe to very substantial tension in addition to the compressive forces. By utilizing both tension and compressive forces to prevent the pipe member from being extruded or pulled from the coupling member, the coupling or connection will withstand far greater end pressures then any of the prior art couplings.

While I have described an embodiment of my invention employing split rings between the middle ring and the pipe members connected together, my invention is not limited to the use of such a ring. It will be obvious that the rings may be split or made in one or more pieces or they may be solid and formed of a metal or some other material which will permit their expansion or enlargement upon longitudinal movement of the pipe or pipes relative thereto. However, I preferably form the expansible rings out of a hard metal in order to prevent any deformation thereof when the connection is subjected to the end pressures. Greater end pressures can be resisted by the joint if the expansible rings are made of a hard metal than if they are made of a soft metal or some other relatively soft material.

It will be apparent to those skilled in the art that by providing a coupling embodying means which is expansible into tight engagement with the middle ring and the adjacent pipe member when the pipe member is subjected to end pressures, considerably greater end pressures can be withstood by the joint. By an arrangement of this character the resistance to the end pressure is affected by both tension and compressive forces exerted on the pipe member.

While I have shown and described a preferred embodiment of my invention, it will be apparent to those skilled in the art that my invention may be otherwise embodied within the scope of the appended claims.

I claim:

1. In a coupling for joining together pipe members or the like having flared end portions, the combination of a middle ring adapted to extend over adjacent flared pipe ends, said ring having a central portion of substantially uniform diameter and enlarged end portions adjacent thereto for receiving compression rings, a compression ring in each of said enlarged end portions between the middle ring and the adjacent pipe member, means for expanding each compression ring radially into tight engagement with its adjacent pipe member, and means to prevent longitudinal separation of at least one of the pipes and the coupling including an expansible ring extending circumferentially around at least one of the pipe members adjacent the flared end thereof between the central portion of the middle ring and the pipe, said ring having a normal diameter less than that of the extreme end of the pipe and having an edge abutting the flared pipe end adapted to cut into it when the pipe is moved longitudinally of the coupling.

2. In a coupling for a pipe member having a flared end portion, the combination of an outer coupling member extending over the flared pipe member, a compression ring between the outer coupling member and the pipe, means for expanding the compression ring radially into tight engagement with the pipe and the outer member, and an expansible, split ring extending circumferentially around the pipe member adjacent the flared end thereof between the outer member and the pipe, said ring having a normal diameter less than that of the extreme end of the pipe and being expansible into tight engagement with both the pipe and the outer coupling member when the pipe is moved longitudinally of the coupling.

FRANK J. RAYBOULD.